(No Model.)

A. HONRATH.
ELASTIC TIRE FOR VEHICLE WHEELS.

No. 538,517. Patented Apr. 30, 1895.

WITNESSES:
Johna Bergstrom
J. Fred Acker

INVENTOR
A. Honrath
BY Munn & Co
ATTORNEYS.

UNITED STATES PATENT OFFICE.

ALEXANDER HONRATH, OF ST. JOHN, KANSAS.

ELASTIC TIRE FOR VEHICLE-WHEELS.

SPECIFICATION forming part of Letters Patent No. 538,517, dated April 30, 1895.

Application filed January 29, 1895. Serial No. 536,566. (No model.)

*To all whom it may concern:*

Be it known that I, ALEXANDER HONRATH, of St. John, in the county of Stafford and State of Kansas, have invented a new and Improved Elastic Tire for Bicycle and other Vehicle Wheels, of which the following is a full, clear, and exact description.

My invention relates to an elastic tire for bicycle wheels, and wheels for other vehicles, and it has for its object to construct the tire in sections shaped from spring wire or like material, the said sections being so formed as to present a bearing surface upon the felly or band of the wheel, and a cylindrical surface for contact with the ground, the said sections being furthermore so constructed that as the outer periphery of the tire engages with the ground the sections brought under tension will expand in an outwardly direction, resuming their normal shape when carried out of action, thus imparting to the tire all of the characteristics of a pneumatic tire yet providing a tire which will be far more durable.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
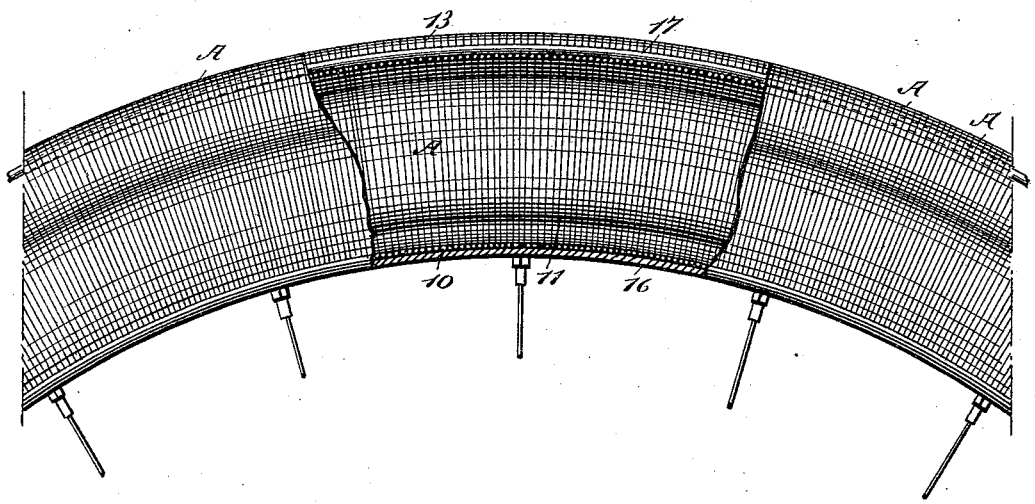
Figure 3:
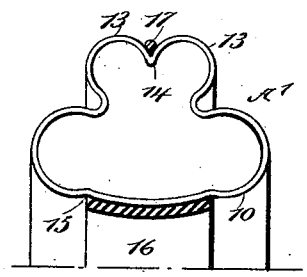
Figure 2:
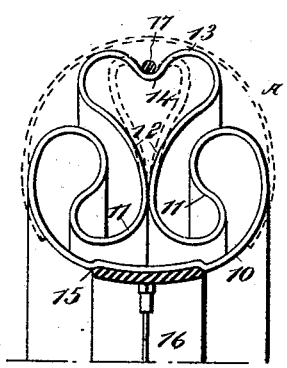
Figure 4:
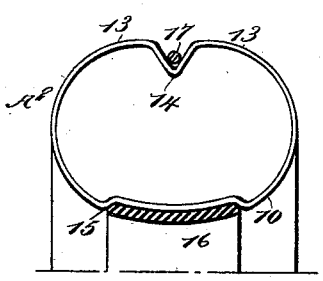

Figure 1 is a side elevation of the improved tire applied to the wheel, a portion of the tire being shown as broken away to disclose the interior. Fig. 2 is a section through the tire, showing one of the members, parts, or sections thereof in side elevation, the rim or felly of the wheel being in cross-section; and Figs. 3 and 4 are sections similar to that shown in Fig. 2, illustrating, however, slight modifications in the formation of the parts or sections of the tire.

In carrying out the invention the tire is made up of any necessary number of sections or members A. These sections or members are made from a material having spring characteristics, preferably steel wire of suitable thickness; and ordinarily the sections or members are formed as shown in Fig. 2, in which they are wider than they are deep. The sections are all of the same size, and are counterparts one of the other.

When forming a section as shown in Fig. 2, the wire is bent to form a curved base 10, the under face being a convexed one, and at the extremities of the base a wire is carried well upward and then inward in direction of the center, and is next carried outward in direction of the side of the base and from thence upward and outward, forming within the base two curved tongues 11, one at each side of the center of the section or member; and the inner faces of these tongues are brought together and constitute a twin shank 12 for a tread surface 13, formed by carrying the metal of the shanks upward and outward in opposite directions and connecting the same, forming the aforesaid cylindrical tread; and in the center of this cylindrical tread a depression 14 is produced. Thus it will be observed that in the formation of a section or member, as shown in Fig. 2, the base is connected with the tread, yet separated from said tread by means of spring tongues; and that when pressure is exerted upon the tread of a section or member in an inwardly direction, the shanks of the tread will expand and likewise the spring tongue and pass in a lateral direction; and that when the said tension is removed the parts will resume their normal position. A recess 15 is made in the bottom of the base section in which the band or felly 16 of the wheel is neatly fitted, in order that the sections shall not slip laterally.

In constructing the tire the sections or members A are placed one against the other along the band or felly of the wheel until the same is entirely covered, the sections or members being held compactly together; and all of these sections thus grouped are held in place firmly and securely by means of a tie 17, which preferably consists of a wire of suitable size located in the recesses 14 of all the parts, members or sections, the ends of the said tie being secured together in any suitable or approved manner to form a tie band, the said band being sufficiently tight to bind all of the sections or members A closely together, making thereby a continuous tire made up of a number of sections or members.

In Fig. 3 I have shown a slight modification in the form of the member or section A'. The tread 13 remains the same as shown in Fig. 2, but the tongues 11 are omitted, and the wire is carried from the side portions of the tread section inward and then outward to join the base, forming substantially a tre-foil figure.

In Fig. 4 the section $A^2$ is shown as substantially oblong in shape, the recess 14 in the tread being very pronounced, and the recess 15 in the base section of the member is still retained. No matter what form of section or member is employed, the said sections or members are preferably tied together in the same manner.

It will be understood that instead of employing a series of independent members in the construction of the tire, the said tire may be made from wire or its equivalent bent to form a series of continuous or connected members.

If in practice it is found desirable, the tire may be partially or entirely covered by a casing of leather, rubber or like material, as shown in dotted lines in Fig. 2, and as further shown in the same view, the tread of the tire may be made wide or narrow and the shanks 11, more or less curved or straight.

Having thus described my invention, I claim as new and desire to secure by Letters Patent—

1. A yielding tire for vehicle wheels, the same consisting of sections or members constructed of a spring metallic substance placed in close contact with each other, the base of the members being recessed to receive the band or felly of a wheel and the tread face of all of the sections being provided with a depression, and a tie located in the said depressions and binding the sections together, substantially as shown and described.

2. The combination, with the band or felly of a wheel, of a yielding tire, the same comprising a series of sections or members, each section or member being formed of spring wire bent upon itself to provide a skeleton structure embracing a base and a tread, the base being fitted to the felly or band of the wheel, the various sections or members being placed one in close contact with the other, and a tie crossing the outer or tread face of all of the sections and binding the same together in the form of an unbroken ring, substantially as and for the purpose set forth.

3. A section or member or a yielding tire, consisting of a spring wire bent upon itself to form a curved base, a substantially cylindrical tread, tongues located within the base, and a shank connecting the tread with the tongues, as and for the purpose specified.

ALEXANDER HONRATH.

Witnesses:
WILLIAM DIXON,
T. W. MOSELEY.